United States Patent
Buchan

[15] 3,700,902
[45] Oct. 24, 1972

[54] OPTICAL INFORMATION PROCESSING USING VARIABLE ELECTRO-OPTIC SPATIAL FILTER

[72] Inventor: William R. Buchan, Lincoln, Mass.
[73] Assignee: Itek Corporation, Lexington, Mass.
[22] Filed: Jan. 13, 1971
[21] Appl. No.: 106,075

[52] U.S. Cl.............250/201, 250/213 R, 350/150, 350/162 SF
[51] Int. Cl............................G01j 1/20, G06g 9/00
[58] Field of Search............350/162 SF, 150, 160 R; 250/213 R, 225, 201; 340/172.5

[56] References Cited

UNITED STATES PATENTS

| | | | |
|---|---|---|---|
| 3,085,469 | 4/1963 | Carlson | 350/162 SF |
| 3,566,130 | 2/1971 | Aldrich et al. | 350/150 |
| 3,396,305 | 8/1968 | Buddecke et al. | 350/150 |
| 3,083,262 | 3/1963 | Hanlet | 350/150 |
| 3,499,157 | 3/1970 | Satake et al. | 350/150 |
| 3,517,206 | 6/1970 | Oliver | 350/150 |

OTHER PUBLICATIONS

Myers et al., IBM Technical Disclosure Bulletin, Vol. 11, No. 10, March 1969, pp. 1314–1316.

*Primary Examiner*—David Schonberg
*Assistant Examiner*—Ronald J. Stern
*Attorney*—Homer O. Blair, Robert L. Nathans, David E. Brook and Joseph S. Iandiorio

[57] ABSTRACT

Apparatus is disclosed including an optical information processing system including a variable electro-optic spatial filter including an electro-optic medium having a characteristic that varies as a function of the intensity of an associated electric field, means for applying an electric field to the electro-optic medium, means for providing to the electro-optic medium a first Fourier transform of radiation representative of information to be processed, means for varying the intensity of the associated electric field to vary the characteristic of the electro-optic medium in a predetermined pattern for modulating information of predetermined spatial frequency included in the first Fourier transform, to produce a modified form of the first Fourier transform, and means for providing a second Fourier transform of the modified form of the first Fourier transform to reproduce a replica of the radiation representative of information to be processed with information of predetermined spatial frequency modified in accordance with the intensity pattern of the associated electric field.

1 Claim, 10 Drawing Figures

PATENTED OCT 24 1972
3,700,902
SHEET 1 OF 2
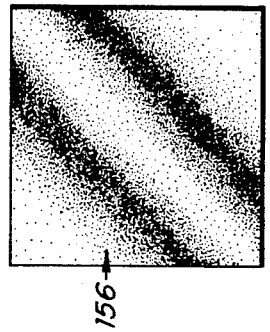
FIG. 4.
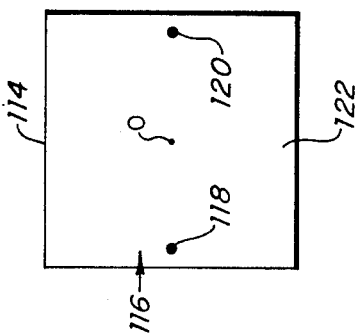
FIG. 3.
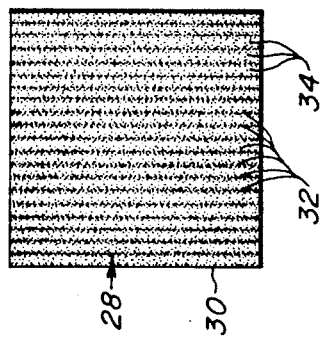
FIG. 2.
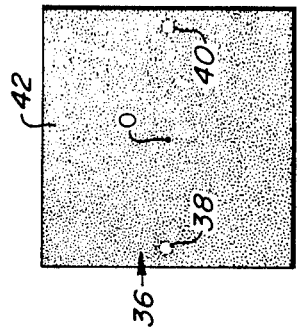
FIG. 1.
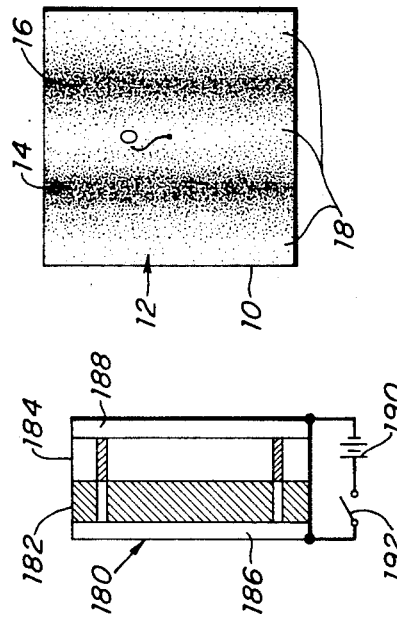
FIG. 10.
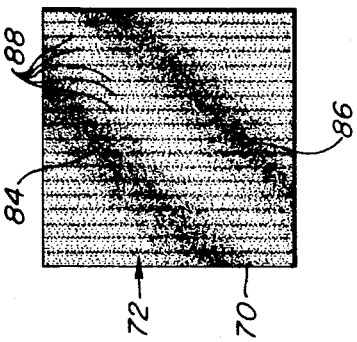
FIG. 9.
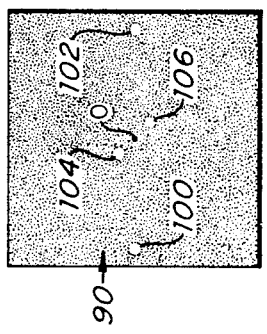
FIG. 8.
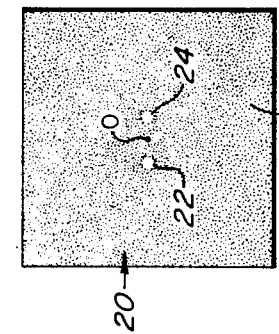
FIG. 7.
FIG. 6.
WILLIAM R. BUCHAN
INVENTOR.
BY
*Jandiorio & Grodberg*
ATTORNEYS.

OPTICAL INFORMATION PROCESSING USING VARIABLE ELECTRO-OPTIC SPATIAL FILTER

CHARACTERIZATION OF INVENTION

The invention is characterized in the processing of optical information by providing, to an electro-optic medium having a characteristic that varies with the intensity of an associated electric field, a first Fourier transform of radiation representative of information to be processed, varying the intensity of the associated electric field to vary the characteristic of the electro-optic medium in a predetermined pattern for modulating information of predetermined spatial frequency included in the first Fourier transform to produce a modified form of the first Fourier transform, providing a second Fourier transform of the modified form of the first Fourier transform to reproduce a replica of the radiation representative of information to be processed with information of predetermined spatial frequency modified in accordance with the intensity pattern of the associated electric field.

BACKGROUND OF INVENTION

This invention relates to an optical information processing system, and more particularly to such a system using an electrically responsive variable characteristic of an electro-optic medium to modulate information of predetermined spatial frequency occurring in a Fourier transform of information to be processed.

The quality of optical images may often be significantly improved by the methods of spatial frequency filtering. This may be accomplished by deriving a Fourier transform of the optical image, filtering out information of predetermined spatial frequency and deriving a Fourier transform of that image as modified by the filtering operation. The Fourier transform of the Fourier transform of an optical image produces the original image but modified as per the filtering operation. A simple application of this technique may be employed to remove the effects of the grain of a photographic film. Since the grain is quite regular in occurrence, i.e., it has a defined range of spatial frequencies, the portion of the first Fourier transform containing that information may be modulated to minimize or totally eliminate that information, so that the replica of the original image produced by the derivation of the second Fourier transform, no longer contains that information: the grain effect is eliminated throughout the image without loss of the other information which occurs at other spatial frequencies. Generally, the use of this technique of spatial filtering is a trial and error operation. In typical optical processors of this type, various masks are inserted in the image formed by the first Fourier transformation to eliminate information of one or more spatial frequencies until a satisfactory image is produced. Once so processed, an image may be resubmitted to the system to undergo further spatial frequency filtering in another range or dimension. There are other techniques for such spatial filtering of optical information. The "optical image" may be submitted to a properly programmed digital computer where it can be analyzed in terms of its spatial frequency patterns, and then filtered electrically to have information of one or more spatial frequencies removed or minimized. The results of such analysis may be displayed in the form of a photographic image. One disadvantage of both these techniques is that for each spatial frequency or combination thereof, a separate action is required. In the typical optical processor a mask must be fabricated and introduced into the system proximate the first Fourier transform. In the computer method of filtering the machine must be specifically programmed to perform the filtering of each spatial frequency. Also the computer performs in a serial manner by operating sequentially on information fed to it by a scanning process so that the processing is relatively slow.

SUMMARY OF INVENTION

Thus it is desirable to have available an optical information processing system having a variable spatial filter.

It is also desirable to have available such a spatial filter which uses an electro-optic medium having a characteristic that varies as a function of the intensity of an associated electric field.

The invention may be accomplished by an optical information processing system including a variable electro-optic spatial filter including an electro-optic medium having a characteristic that varies as a function of the intensity of an associated electric field. There are means for applying an electric field to the medium and means for providing to the medium a first Fourier transform of radiation representative of information to be processed. The intensity of the associated electric field is varied to vary the characteristic of the electro-optic medium in a predetermined pattern for modulating information of predetermined spatial frequency included in the first Fourier transform to produce a modified form of the first Fourier transform. A second Fourier transform is produced of the modified form of the first Fourier transform to reproduce a replica of the radiation representative of the information to be processed with information of predetermined spatial frequency modified in accordance with the intensity pattern of the associated electric field.

DISCLOSURE OF PREFERRED EMBODIMENT

Other objects, features and advantages will occur from the following description of a preferred embodiment and the accompanying drawings, in which:

FIG. 1 is a representation of an image bearing low frequency information.

FIG. 2 is a representation of a Fourier transform of the image of FIG. 1.

FIG. 3 is a representation of an image bearing high frequency information.

FIG. 4 is a representation of a Fourier transform of the image of FIG. 3.

FIG. 6 is a representation of an image bearing low and high frequency information to be processed by the system of FIG. 5.

FIG. 7 is a representation of a Fourier transform of the image of FIG. 6.

FIG. 8 is a representation of a mask used to control the variable filter of FIG. 5 to eliminate the high frequency information of the image of FIG. 6.

FIG. 9 is a representation of the image of FIG. 6 with the high frequency information filtered out.

FIG. 10 is a diagram of a second variable spatial frequency filter which may be used in the system of FIG. 5.

Figure 5:
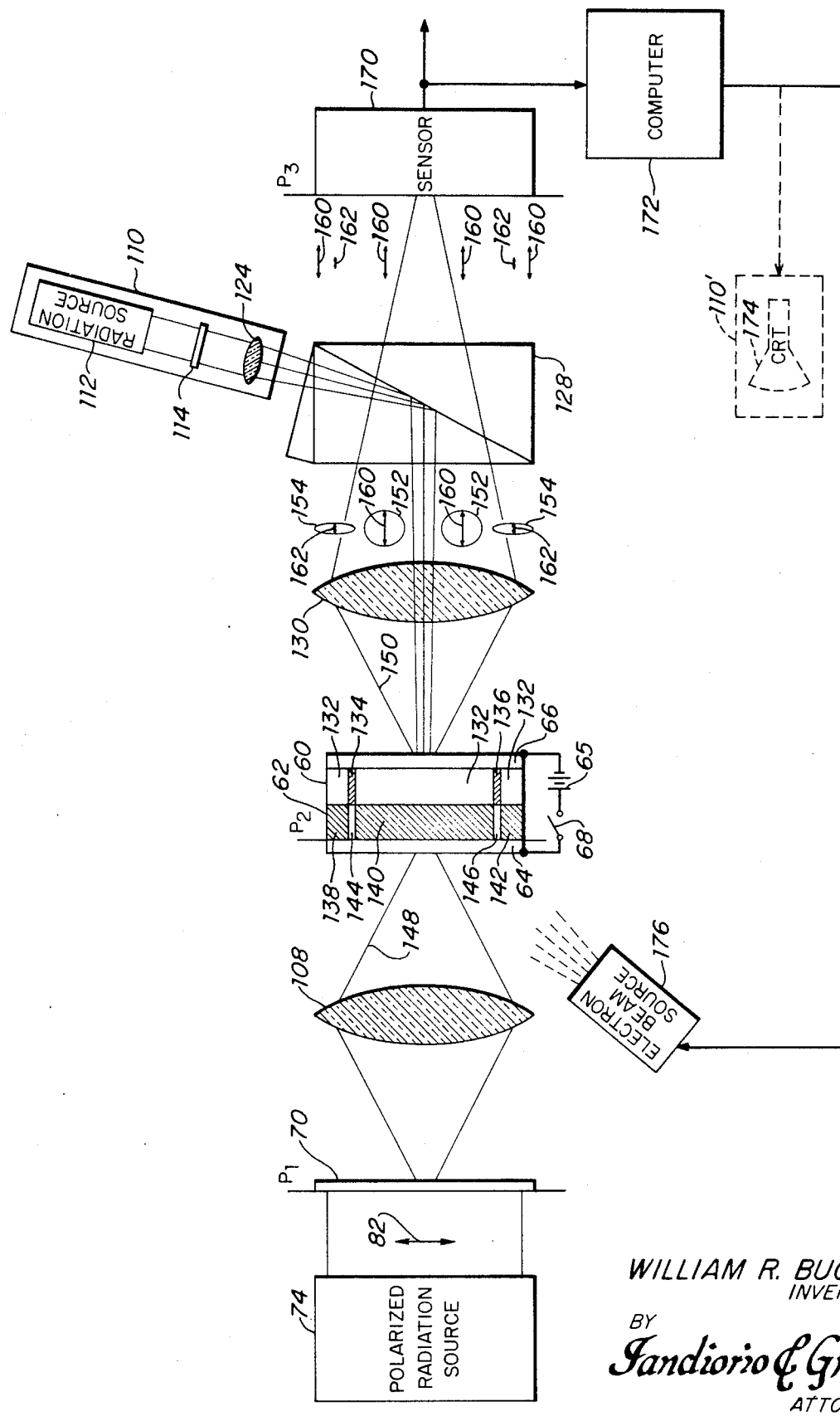
FIG. 5 is a diagrammatic view of an optical information processing system using a variable spatial frequency filter according to this invention.

The invention may be embodied in an optical processing system wherein an object formed of polarized radiation at a first plane is transformed by a first lens to a first Fourier transform of that object at a second plane. An electro-optic medium exhibiting the characteristic of electrically induced birefringence may be placed at the second plane. A photoconductive medium may be associated with the electro-optic medium and an electric field may be applied across them using a pair of electrodes connected to a source of electrical energy. An image of a filter mask is projected onto the photoconductive medium causing the conductivity of that medium to increase by a greater amount in the areas struck by more intense radiation and in a lesser amount in the areas struck by less intense radiation. As a result the electric field is more intense across portions of the electro-optic medium proximate the areas of the photoconductive medium struck by more intense radiation and is less intense across portions of the electro-optic medium proximate the areas of the photoconductive medium struck by less intense radiation. In the portions of higher electric field intensity the birefringence is more pronounced so that the radiation subject to those portions is elliptically polarized to a greater extent than is the radiation subject to the portions of the electro-optic medium experiencing lower electric field intensity. The elliptically polarized radiation is received by a second lens which forms a second Fourier transform at a third plane. Between the second and third planes is placed an analyzer, such as a crossed polarizer, which transmits only the components of the elliptical radiation orthogonal to the plane of polarization of the input radiation. The image produced at the third plane is therefore a replica of the original image with certain information, occurring at the spatial frequencies blocked or attenuated by the interaction of the filter mask and the crossed polarizers and birefringence characteristic of the electro-optic medium, minimized or eliminated. The particular spatial frequency information affected is determined by the pattern of variation of the intensity of radiation incident on the photoconductive medium.

The radiation modulated by the electro-optic medium may be transmitted by the medium, or may be reflected back through it. The radiation used to expose the photoconductive medium and that used to read out the electro-optic medium need not be visible light.

Serial as well as parallel readout may be performed by scanning the electro-optic medium with a beam of radiation. Similarly, the photoconductive medium may be exposed serially as well as in parallel and the photoconductive medium can be replaced by some other means for applying an electric field to the electro-optic medium such as a dielectric storage tape or a scanning electron beam.

If the electro-optic medium is as well an electric blocking layer, the source of electrical energy may be disconnected after the exposure of the photoconductive medium and the charges that migrated while the photoconductive medium was exposed will be trapped due to the blocking action of the electro-optic medium and cause the index of refraction variation pattern to be fixed in the device. The device may be erased and reused by shorting the electrodes during a subsequent uniform exposure of the photoconductive medium. If the electro-optic medium is not also an electric blocking medium, the device functions only as a real time device, i.e. the electric field intensity pattern is present only while the image is present at the photoconductive medium.

The associated electric field read out by means of this invention may be due to a surface charge on the electro-optic medium, or an internal electric field or an external electric field. Further, the field may be stored, as for example by persistent internal polarization, or may be momentary, as occurs when the device is used as a camera or image intensifier or converter.

Various other mediums and materials such as photoelectrets, ferroelectric materials, and others may be used alone or in various combinations in this invention. Able to be used in this invention are devices having an electro-optic layer of e.g. KDP, DKDP, lithium niobate combined with a photoconductive layer of e.g. amorphous ZnS, ZnSe, ZnTe, CdS; or a device having a layer containing a medium which is both an electro-optic and a photoconductive medium, e.g. cubic (100) ZnS, ZnSe, ZnTe; combined with a blocking layer, e.g. polystyrene, $SiO_2$; or a device having a layer containing an electro-optic and a ferro-electric medium, e.g. bismuth titanate combined with a layer of an amorphous photoconductor. The storage devices may be distinguished from the momentary or real time devices by presence of a blocking medium for preventing charge leakage to maintain the electric field for a substantial period of time. The blocking medium may be a separate dielectric layer or may be an electro-optic medium which also functions as a blocking layer.

The application of Fourier analysis in information processing systems may be understood with reference to FIGS. 1, 2, 3 and 4. FIG. 1 shows a transparency 10 containing an image 12 including low frequency information represented by two widely spaced vertical high density areas 14, 16 on a low density background 18. The optical axis is identified at 0. FIG. 2 shows an image 20 of the Fourier transform of the image 12 of FIG. 1: two bright spots 22, 24 close to the optical axis 0 of image 20 on a high density background 26. An image 28, FIG. 3, on transparency 30 contains higher frequency information represented by a plurality of closely spaced vertical high density lines 32 on a low density background 34. The image 36, FIG. 4, of the Fourier transform of image 28 contains two bright spots 38, 40 widely spaced from the optical axis 0 of the image 36 on high density background 42. In a perfect system a Fourier transform of image 20 reproduces image 12 and of image 36 reproduces image 28. If the radiation from the bright spots of image 20 or 36 is attenuated or completely blocked the information in images 12 and 28, respectively, is not present in the second Fourier transform.

One embodiment of the variable spatial filter of this invention in an information processing system using Fourier techniques employs a photoconductor layer 60, FIG. 5, adjacent an electro-optic birefringent layer 62 between two electrodes 64, 66 energized by battery 65 through switch 68. A transparency 70 carrying an image 72, FIG. 6, containing information to be processed at plane $P_1$ is irradiated with radiation from polarized radiation source 74 polarized as shown by arrow 82. Image 72, FIG. 6, includes two widely spaced slanted, high density lines 84, 86 and a plurality of closely spaced vertical, high density lines 88. The image 90, FIG. 7, of the Fourier transform of the image 72 including two, widely spaced spots 100, 102 due to lines 88, and two closely spaced spots 104, 106 due to lines 84, 86 is formed at plane $P_2$ at layer 62 by lens 108.

Information of predetermined spatial frequency may be selectively filtered by varying the field intensity across electro-optic layer 62 to vary the birefringence of that layer to modulate the portions of the image 90 at $P_2$ that carry the information of that predetermined spatial frequency. One means 110 for varying the electric field intensity across layer 62 includes a radiation source 112 for irradiating a mask 114, FIG. 8, the image 116 on which includes two widely spaced high density spots 118, 120, on a transparent background 122, corresponding to the spots 100, 102 that represents the high frequency information, lines 88, of the original image 72. Image 116 is cast on photoconductor layer 60 by lens 124 through beam splitting polarizing prism 128 and lens 130.

In areas 132 of layer 60 struck by high intensity radiation from transparent background 122, the conductivity is high whereas in areas 134, 136 struck by lower intensity radiation from spots 118, 120, the conductivity is low. Therefore the electric field intensity across areas 138, 140, 142 of electro-optic layer 62 is high and across areas 144, 146 is low. Since the birefringence of layer 62 increases with electric field intensity, areas 138, 140, 142 have more pronounced birefringence and produce greater elliptical polarization of radiation 148 that forms image 90 at $P_2$ than the elliptical polarization produced by areas 144, 146. Thus portions of radiation 150 from areas 138, 140, 142 of layer 62 are more elliptically polarized, polarization indicators 152, than portions from areas 144, 146, polarization indicators 154.

Lens 130 forms a Fourier transform image 156, FIG. 9, of image 90, FIG. 7, at plane $P_3$, FIG. 5. Polarizer 128 passes only the horizontal components 160, 162 of the elliptical fields 152, 154. Thus, since the cross-components 162 from areas 144, 146 are smaller than the cross-components 160 from areas 138, 140, 142, the information represented by spots 100, 102 of image 90 has been modulated: it has been reduced or eliminated and the image 156 is a replica of the original image 72 but with the high frequency information lines 88, omitted; only the low frequency information, lines 84, 86, remains.

A sensor 170, which may be a display screen, photographic plate, T.V. camera, or other photosensitive device, may be placed at $P_3$ to receive the processed information. Further, such a device may be connected to a computer 172 for analyzing the processed information. Means 110 may be replaced with means 110' which includes a CRT 174 for serially providing a radiant image at layer 60 to vary the electric field across layer 62. CRT 174 may be driven by an external source or by computer 172, for example, to form a feedback loop whereby the processed image presented to sensor 170 is analyzed by computer 172 which then adjusts the image produced by CRT 174 to produce the desired effect on the image at $P_3$. Alternatively, a variable electric field may be associated with layer 62 without the use of layer 60 by means of an electron beam source 176 which can be driven by computer 172 or other means to produce the desired pattern of electric field intensity at layer 62.

Another variable optical frequency filter 180 containing a medium which has both photoconductive and electro-optic characteristics which may be used in a system such as shown in FIG. 5, is shown in FIG. 10. The electro-optic photoconductor medium contained in layer 182 and blocking layer 184 are included between two electrodes 186, 188 which may be connected to a battery 190 through switch 192. In operation with switch 192 closed a field is developed across layers 182, 184. Radiation incident on layer 182 causes its conductivity to increase so that the field decreases across layer 182. Since layer 182 is also the electro-optic medium the field is lowest across the electro-optic medium where the radiation which strikes it is of the highest intensity. Thus the electro-optic characteristic of layer 182, for example birefringence, is less pronounced in areas struck by higher intensity radiation. This is the opposite of the operation of the variable spatial frequency filter constituted by layers 60, 62.

Other embodiments will occur to those skilled in the art and are within the following claims:

What is claimed is:

1. An optical information processing system comprising:

a variable electro-optic spatial filter comprising an electro-optic medium that exhibits electrically induced birefringence which varies as a function of the intensity of an electric field applied thereacross, a photoconductive medium associated with said electro-optic medium and an electrical blocking layer for preventing charge leakage, said electro-optic medium, photoconductive medium and electrical blocking layer being positioned between two transparent electrodes having means for establishing an electric field thereacross;

first lens means for providing to said variable electro-optic spatial filter a first Fourier transform of radiation to be processed;

means for projecting an image of a pattern comprising the intended spatial filtering function onto said electro-optic spatial filter to vary the applied electric field across said electro-optic medium according to said pattern for modulating information of predetermined spatial frequency included in said first Fourier transform, to produce a modified form of said first Fourier transform;

second lens means for providing a second Fourier transform of said modified form of said first Fourier transform to reproduce a replica of said radiation representative of information to be processed with information of predetermined spatial frequency modified in accordance with the intensity pattern of said applied electric field, sensor means for sensing the modified information pattern positioned after said second lens means for providing the second Fourier transform;

digital computer means for analyzing the distribution of light intensity sensed by said sensing means and computing a new pattern for modulating information of predetermined spatial frequency at said filter; and, feedback means for varying the electric field applied across said spatial filter in accordance with the new pattern generated by said digital computer means.

* * * * *